United States Patent [19]

Volta

[11] 4,354,216
[45] Oct. 12, 1982

[54] DETECTOR DEVICE FOR OVERCURRENTS AND THE LOSS OF ONE OR TWO PHASES

[75] Inventor: Ideo Volta, Zola Predosa, Italy

[73] Assignee: La Puntimatic S.n.C. di Musiani Franco & C., Bologna, Italy

[21] Appl. No.: 182,589

[22] Filed: Aug. 29, 1980

[30] Foreign Application Priority Data

Sep. 3, 1979 [IT] Italy ................................ 3487 A/79

[51] Int. Cl.$^3$ ................................................ H02H 3/24
[52] U.S. Cl. ........................................ 361/92; 361/94
[58] Field of Search ............................ 361/92, 94, 29

[56] References Cited

U.S. PATENT DOCUMENTS

| | | | |
|---|---|---|---|
| 3,942,074 | 3/1976 | Graham | 361/94 |
| 3,996,499 | 12/1976 | Gary et al. | 361/29 X |
| 4,000,446 | 12/1976 | Vandevier et al. | 361/92 X |
| 4,006,387 | 2/1977 | Hudak | 361/94 X |
| 4,103,317 | 8/1978 | Krick | 361/31 |

FOREIGN PATENT DOCUMENTS 2523365 12/1975 Fed. Rep. of Germany ........ 361/92

52920 3/1967 Poland .................................. 361/92

Primary Examiner—Reinhard J. Eisenzopf
Attorney, Agent, or Firm—Fleit & Jacobson

[57] ABSTRACT

Disclosed herein is a device that detects overcurrents and the loss of one or two phases occurring suddenly in the supply line of electrically operated devices. In both cases, the aforementioned detection is followed by generation of a deenergization signal so as to disconnect the circuits from the electricity mains. The phase loss is detected when, in one or two phases of the line, the line current is below, for a predetermined time, an established value. The overcurrent detection takes place when a line current exceeds, for a predetermined time, a threshold value. In one form or embodiment, the device trips immediately; in another, it operates with a time lag that is a function of the ratio between the line overcurrent and the threshold value, and it again becomes nonoperative when the overcurrent ceases, as a function of the said ratio. According to the invention, when all three phases experience an undercurrent, generation of the deenergization signal is inhibited.

4 Claims, 6 Drawing Figures

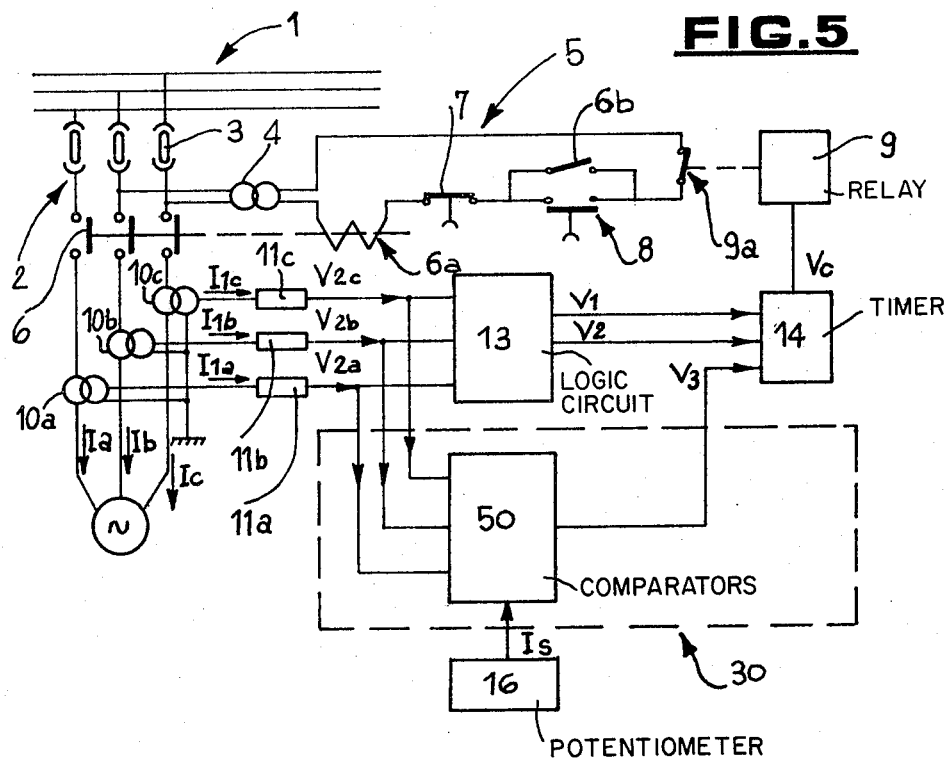
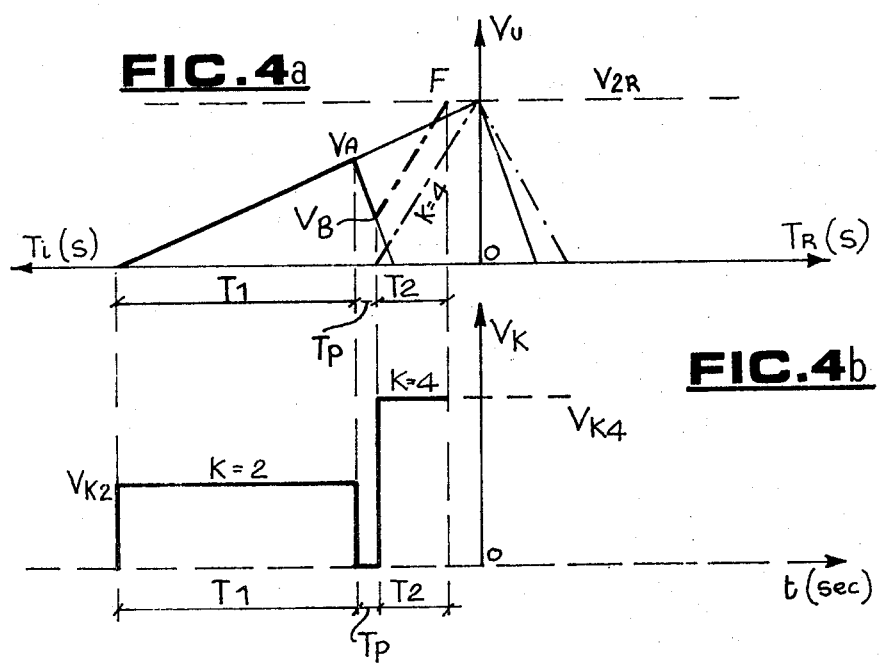

DETECTOR DEVICE FOR OVERCURRENTS AND THE LOSS OF ONE OR TWO PHASES

BACKGROUND OF THE INVENTION

The invention relates to a device for detecting overcurrents and the loss of one or two phases, and is particularly suitable for use as a motor overload cutout.

DESCRIPTION OF THE PRIOR ART

It is known that in order to protect electric motors against damage caused by overcurrents (the insulants thereof heating up and interconductor dynamic stress) use is made of suitable means of protection, known also as overload cutouts.

The most common overload cutouts are constituted by fuses or by maximum current relays, the latter operating, with a predetermined time lag, the contactor of the motor.

It is also known, bearing in mind a well known phenomenon of physics consisting in the fact the the rise in temperature of a conductor follows a practice that is exponential (phenomenon known as "thermal inertia"), that use is frequently made of what are called "time dependent" relays whose operation is, approximately, inversely proportional to the value of the overcurrent. The best known "time dependent" relays are thermal cutouts, and with these various problems, as outlined below, occur.

The thermal cutout covers a limited current range, thus compelling the manufacturers to put a series of thermal cutouts on the market in order to cater for the range of supply current values appropriate to the electric motors that are presently on sale. Once it has operated, the characteristics of the thermal cutout do not always match those outlined on the rating plate thereof and, furthermore, it is influenced by ambient factors, such as variations in the temperature, humidity and dust.

In the more sophisticated thermal cutouts, the loss of one or two phases is detected not as a loss of current in the phase or phases concerned but as an increase of current in the remaining phases or phase, which, in the case of three phase motors running at a reduced load, cannot always be detected with certainty.

SUMMARY OF THE INVENTION

The object of the invention is to overcome the above mentioned problems and, in particular, to make available a device that is able to detect overcurrents in the line and to come into action with a lag of the time dependent type, as a function of the ratio between the overcurrent and a set value, and is able to detect the loss of one or two phases as a decrease in current in the phase or phases concerned, independently of the quantities in play in the remaining phases or phase without, however, tripping at the time the said device is energized.

Another object of the invention is to make available a device that is able to cover a wide range of currents, without this being prejudicial to the operation thereof, and is such that the rating plate characteristics thereon are reproduced faithfully even after a plurality of operations.

A further object of the invention is to make available a device, the operation of which, in the case of the detection of an overcurrent, takes into consideration the thermal vicissitudes occasioned by some previous overcurrent.

The aforementioned objects are attained with the invention relating to a detector device for overcurrents and the loss of one or two phases, placed on the supply line of corresponding electrically operated means and linked to operating means, the actuation of which brings about that of sound and/or visual signals, and/or the tripping of the means that place the motor circuit switch in action, essential characteristics of the device according to the invention being that it comprises: first electric means, one for each phase of the said line, provided to furnish an output signal proportional to the peak value of the current of the said phase; a detector circuit for the loss of one or two phases, connected to the output of the said first electric means, provided to furnish a first electric output signal when at least one of the peak values of the currents in the line is below an established value, and to furnish a second electric output signal when the peak values of all the currents in the line are below an established value; second electric means, the input of which is connected to the output of the said first electric means, provided to furnish a third electric output signal when the peak values of any one of the currents in the line attains a predetermined functional level with respect to that set for a threshold signal; and a time lagging circuit, connected to the output of the said phase loss detector circuit and to the output of the second electric means, provided to de-energize the aforementioned operating means with a predetermined time lag with respect to the actuation thereof, the said time lagging circuit being actuated by the said first and third electric signals, and being taken out of operation by the said second electric signal.

BRIEF DESCRIPTION OF THE DRAWINGS

In order to emphasize further characteristics and advantages of the invention, detailed descriptions are given below of two preferred, though not sole, forms of embodiment for the device in question, which are illustrated purely as unlimited examples on the accompanying drawings, in which:

FIGS. 3, 4a and 4b illustrate, in individual graphs, the salient points in the operation of the said section;

FIG. 5 illustrates, in a part functional and part block diagram, the second form of embodiment for the device in question.

DESCRIPTION OF THE PREFERRED EMBODIMENTS

Figure 1:
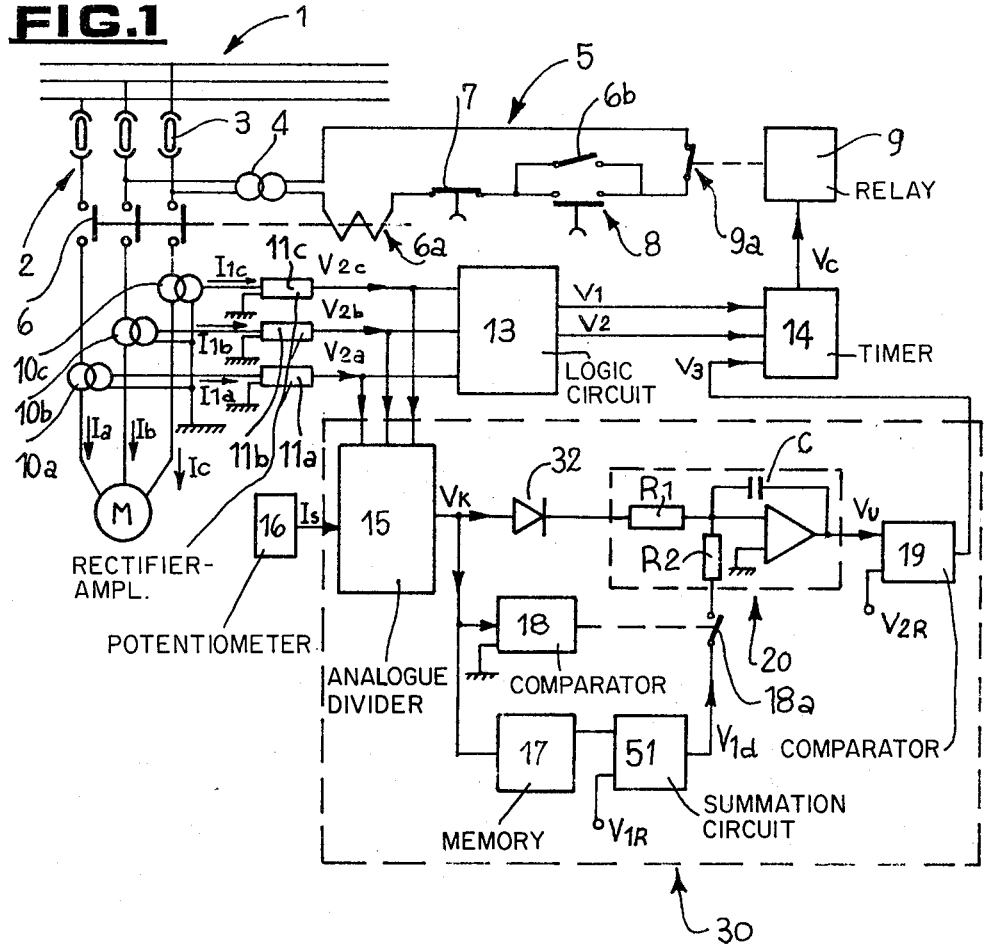
FIG. 1 illustrates, in a part functional and part block diagram, the first form of embodiment for the device in question.

With reference to the above mentioned FIGS, at 1 is shown a three phase line from which is shunted a three phase line 2 that supplies a three phase motor M of a known type.

The line 2 has connected to it, commencing from the line 1, the fuses 3, a contactor 6 and three instrument (or T.A.) transformers 10a, 10b and 10c, one per phase.

The solenoid 6a that operates the contactor 6 is wired in series into a low voltage circuit 5 supplied by the secondary winding of a transformer 4, the primary winding of which is shunted between two phases of the line 2.

The circuit 5 comprises, furthermore, an "on" pushbutton 8, a normally open self excitation contact 6b (operated by the solenoid 6a), a "stop" pushbutton 7 and a (normally closed) contact 9a operated by a relay 9.

When the pushbutton 8 is depressed, the solenoid 6a is excited (and remains self excited through the closing of the contact 6b) and this brings about the closing of the contactor 6. The operation of the pushbutton 7 causes the solenoid 6a to be de-energized and the contactor to open. The solenoid 6a is also de-energized through the opening of the contact 9a which occurs as a consequence of the excitation of the relay 9 through an output signal Vc supplied by a lagging circuit 14 of a known type. The ways in which the signal Vc is emitted will be examined hereunder.

As is known, the said instrument transformers 10a, 10b and 10c perform a dual task, that is to say, that of supplying the secondary currents $I_{1a}$, $I_{1b}$, and $I_{1c}$ reduced in accordance with a predetermined instrumental constant with respect to the corresponding line currents Ia, Ib and Ic, and that of isolating the line 2 with respect to the devices supplied by the said transformers.

The said currents $I_{1a}$, $I_{1b}$ and $I_{1c}$ are sent to the input of three corresponding rectifier-amplifier groups 11a, 11b and 11c, thereby producing, at the output of the latter, the corresponding voltage signals V2a, V2b and V2c, each of which is proportional to the peak value of the corresponding line current.

The aforementioned voltage signals are sent to three inputs of a circuit 13 that is able to detect the loss of one or two phases in the three phase line 2. The circuit 13 is of the binary logic type and is able to satisfy the undermentioned functions:

(a) when the peak value of any one of the currents in the line is below a predetermined value, the circuit 13 furnishes an output (or first electric) signal $V_1$;

(b) when all the peak values of the currents in the line are below a predetermined value (not necessarily identical to the former) the circuit 13 furnishes an output (or second electric) signal $V_2$.

The output of the circuit 13 is connected to the input of the lagging circuit 14. The signal $V_1$ places the circuit 14 in operation and this, with a time lag that is predetermined with respect to the operation thereof (1-2 seconds, for example), furnishes the said output signal $V_c$ for the excitation of the relay 9. It thus ensues that if the loss of one or of two phases were to continue for an amount of time in excess of the said time lag, the opening takes place of the contact 9a, the solenoid 6a is de-energized, and the contactor 6 consequently opens.

The signal $V_2$, to the contrary, takes the circuit 14 out of operation and this prevents the contactor from opening. This is particularly advantageous since the said contactor is allowed to close with the motor M at a standstill and with the device in question energized.

Furthermore, the signals V2a, V2b and V2c are sent to three inputs of an analogue divider 15 whose task is to supply an output signal Vk. The said signal Vk is less than zero when the ratio K between the maximum value of the currents in the line and a threshold value Is (set on the divider 15 by means of a circuit 16, and adjustable over an ample range) is less than a unit, while it is more than zero for $K>1$. In the latter instance, that is to say, for $K>1$, the signal Vk (which for values greater than zero will be referred to hereinafter as the first analogue signal) is a function of K itself.

The said first analogue signal is sent (with the interposition of a diode 32) to the input of an integrator circuit 20, to the input of a comparator circuit 18 and to the input of a memory 17 (constituted, for example, by a capacitor) which, with sufficient rapidity, easily matches the swings of Vk positive.

The output of the memory 17 is connected to the input of a summation circuit 51, the remaining input of which is maintained at a reference (or first reference signal) voltage $V_{1R}$ of a value greater than the maxium presumable value adopted by Vk. Present at the output of the summation circuit 51 is the signal $V_{1d}$ (or second analogue signal) proportional to the value $Vk-V_{1R}$, and therefore always negative, the absolute value of which tends to increase (or to decrease) as Vk decreases (or increases). The signal $V_{1d}$, with the contact 18a closed, is sent to the input of the integrator circuit 20. The contact 18a is opened or closed by the comparator 18 when the signal Vk is greater and less than zero, respectively.

On account of the foregoing, with $Vk>0$, the contact 18a is opened and the diode 32 is polarized in a forward direction, thus causing the first analogue signal Vk to be present at the input of the integrator circuit 20. The output signal Vu of the circuit 20 is constituted by an ascending inclination, the slope of which is proportional to $Vk/R_1.C$.

In the case of $Vk<0$, the contact 18a is closed and the signal $V_{1d}$ is present at the input of the circuit 20. The output signal Vu of the circuit 20 is constituted by a descending inclination (since $V_{1d}<0$), the slope of which is proportional to $V_{1d}/R_2.C$.

The signal Vu is sent to the input of a comparator circuit 19 which, with $Vu=V_{2R}$, furnishes at the output thereof (which is connected to the circuit 14) a signal $V_3$ (or third electric signal) which brings about the actuation of the said circuit 14 with all the consequences seen above.

To conclude, the circuit 14 is actuated by one or the other of the signals $V_1$ and $V_3$ (which if persistent for the stated predetermined time, allows the said circuit to furnish the output signal Vc), and is taken out of action solely by the signal $V_2$.

A description will now be given of the section 30 which is defined by the divider 15, the memory 17, the summation circuit 51, the diode 32 and the circuits 18, 20 and 19.

Figure 3:
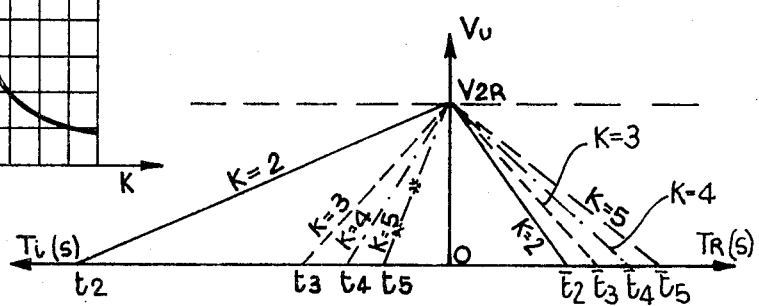

As pointed out above, for $K>1$, $Vk>0$: assuming for simplicity $K=2$, $Vk=Vk2$ (constant); the integral of Vk2, that is to say Vu, is an ascending inclination shown in the graph in FIG. 3, wherein the time is indicated on the abscissa and the signal Vu on the ordinate: the origin of the times (t=0) occurs when $Vu=V_{2R}$.

It can be clearly seen from the graph in FIG. 3 that for $K=2$ a $t_2$ operating time is needed in order that Vu be equal to $V_{2R}$; for $K=3$ a $t_3$ time, for $K=4$ a $t_4$ time and for $K=5$ a $t_5$ time (by way as an example, in one form of embodiment of the Applicant herein, $t_2=25$ seconds, $t_3=10$ seconds, $t_4=7$ seconds and $t_5=5$ seconds).

Again from FIG. 3, it is obvious that the equality $Vu=V_{2R}$ (which defines the Ti operation time) is a function of the inverse of K. When, in fact, K increases, the value of Vk increases and, consequently, so does the slope of the inclination Vu.

Figure 2:
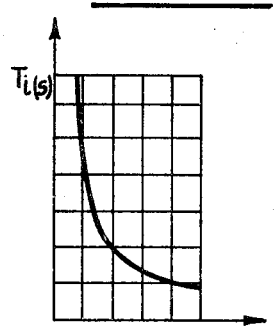
FIG. 2 illustrates the time operation characteristic, as a function of the ratio between the peak value of the current of the line and a set threshold value, supplied by the overcurrent detection section of the device shown in FIG. 1.

FIG. 2 illustrates the dependence of the operating time Ti as a function of K which, as is obvious, is close to a hyperbolic curve. In this way a protection is created of the time dependent type as a function of K.

In the event of the duration of the overcurrent being less than the operating time Ti, the section 30 returns to the non-operative condition with a $T_R$ (reset time) lag as a function of K.

If, in fact, the overcurrent ceases $K<1$, $Vk<0$ and the contact 18a is closed: at the terminals of the circuit 20 only the signal $V_{1d}$ is present (Vk, being less than zero, is blocked by the diode 32).

Supposing for simplicity that the overcurrent ceases because Vu is almost equal to $V_{2R}$, the reset time $T_R$ as a function of K is illustrated in FIG. 3 for certain values of K (in particular $K=2$; 3; 4 and 5 already considered for Ti).

For example, for $K=2$ there is a $t_2$ reset time $=4$ seconds; for $K=5$ a $t_5$ reset time $=7$ seconds, and this, on account of what has been stated earlier on, is derived from the fact that as K grows, the modulus of $V_{1d}$ drops and thus the slope of the inclination of Vu (negative since $V_{1d}<0$) tends to increase.

In other words, the lower K is, the lesser time the section 30 takes to adopt the initial (or non-operative) condition; this has been done in order to take into consideration the heating of the windings of the motor which is all the less, the smaller K is, that is to say, the smaller the value is of the overcurrent (measured by K) that has affected a given phase in the line 2.

The foregoing permits the section 30 to take into consideration thermal vicissitudes that have taken place at a time prior to the sudden occurrence of a further overcurrent.

This has been illustrated, as an example, in FIGS. 4a and 4b wherein, shown hypothetically, an overcurrent defines a $K=2$ (thus a $V_{K2}$) for a $T_1<t_2$ time, such, therefore, as not to cause the emission of the signal $V_3$; after the $T_1$ time the overcurrent ceases and $Vu=V_A$; and for a (pause) time $T_P$ that is less than $t_2$ there are no line overcurrents ($Vk<0$).

When $Vu=V_B$ a further overcurrent takes place, such as to define a $K=4$ (thus a $V_{K4}$); the section 30 recalls the previous thermal vicissitude since Vu does not start from zero but from the value $V_B$, and increases with a slope defined by the value $K=4$.

The equality $Vu=V_{2R}$ occurs at the point F that has been reached in a $T_2$ time (evaluated by the sudden occurrence of the second overcurrent) that is less than the previously mentioned $t_4$.

As already stated, the equality $Vu=V_{2R}$ brings about the emission of $V_3$ with the consequent actuation of the lagging circuit 14 which, with a predetermined time lag with respect to the actuation thereof, de-energizes the solenoid 6a. The time required by the operator to depress the "on" pushbutton 8 to again supply the motor M (assuming that the causes that gave rise to the overcurrent in the line have been eliminated) is more than sufficient to return the device in question to the initial non operative condition, that is to say a condition suited to detecting a further overcurrent or the loss of one or two phases.

To conclude, the device according to the invention detects the loss of one or two phases as the loss of current and not as an increase in the current in the remaining phases or phase and, furthermore, it does not trip if all the currents of the phases are below a predetermined value that is indispensable for the closing of the contactor 6 with the device in question already energized.

Furthermore, the said device operates, in the case of an overcurrent in the line, in accordance with a time lag that is a function of the ratio between the value of the overcurrent and a set threshold value: this makes it possible, with one single device, to cover a vast range of line currents.

In a simplified form, the section 30 of the device is defined by a comparator circuit 50 which, when the difference between the maximum peak value of the currents in the line and the threshold value $I_s$, is greater than zero, emits the said output signal $V_3$ which, as will be recalled, causes the circuit 14 to be actuated.

In both forms of embodiment, the device is not affected either by variations in the ambient temperature or by the presence of humidity or dust and, furthermore, the operation of the device is not subjected to alterations in the rating plate characteristics.

Instead of de-energizing the solenoid 6a, the relay 9 could be used, as an alternative to the above described form of embodiment, to set in motion an audible signal (for example a siren) or a visual signal (for example an indicator lamp).

It is understood that the foregoing description, given purely as an unlimited example, may be varied, adapted or combined (for example, in place of the integrator circuit 20 one could think of utilizing an electronic apparatus that is able to supply a voltage Vu that increases for $Vk>0$ as a function of the level of Vk, and decreases for $V_{1d}<0$ as a function of the level of $V_{1d}$), without in any way deviating from the framework of protection afforded to the invention or from the objects thereof as described above and claimed hereunder.

What is claimed is:

1. A detector device for detecting overcurrents and the loss of one or two phases of a power supply line of an electrically operated device, and for interrupting the supply of power to said electrically operated device upon detecting the overcurrents or the loss of said one or two phases, said device comprising:

first electric means, one for each phase of said power supply line, and having an output for providing an output signal proportional to a peak value of current of said each phase;

detector means connected to said first electric means for detecting the loss of said one or two phases, and having an output for providing a first electric output signal when and so long as the peak value of current of at least one of the phases in the power supply line is below a predetermined valve, and for providing a second electric output signal when and so long as the peak value of current in all the phases in the power supply line is below said predetermined value;

second electric means having an input connected to the output of the said first electric means, and having an output for providing a third electric output signal when and so long as the peak value of current in any one of the phases in the power supply line attains a predetermined level; and time delay means connected to the output of the said detector means and to the output of the second electric means for issuing a deenergization signal to deenergize the elctrically operated device in response to provision of said first and third electric output signals, and for inhibiting issuance of said deenergization signal in response to, and a predetermined delay time after, provision of said second electric output signal.

2. A device according to claim 1, wherein said second electric means comprises first circuitry responsive to said output signal of said first electric means for determining a degree of overcurrent in any one of the phases in the power supply line, and second circuitry responsive to said degree of overcurrent determined by said first circuitry for issuing said third electric output signal only after a time delay inversely proportional to said determined degree of overcurrent.

3. A device according to claim 1, wherein said second electric means comprises means for adjustably varying said predetermined level, and wherein said circuitry of said second electric means determines a ratio between the peak value of current in any one of the phases in the power supply line and said predetermined level, said second electric means providing said third electric output signal only so long as said ratio exceeds unity value, said third electric signal being provided with a time lag, with respect to the instant when the ratio exceeds unity value, which is a function of said ratio.

4. A device according to claim 3, wherein said detector means comprises: an analogue divider for deriving said ratio and furnishing a first analogue output signal having a sign which is defined when said ratio exceeds unity value, and having a value which is a function of said ratio; at least one diode connected to the output of said analogue divider so as to be polarized in a forward direction when said ratio exceeds unity value and to provide a diode output; an integrator for receiving and integrating said diode output to provide an integration output; a memory connected to the output of said analogue divider for storing said first analogue signal when said ratio exceeds unity value; a summation circuit connected to said memory for furnishing a second analogue output signal as a function of the difference between the first analogue signal stored by the memory and a first reference signal; a first comparator circuit connected to the output of said analogue divider and actuated by an inversion in the sign of said first analogue signal when said ratio becomes less than unity value to provide a gate enable signal; gate means connected between said summation circuit and said integrator and responsive to said gate enable signal for providing said second analogue signal to said integrator, said integrator integrating said second analogue signal to provide said integration output, and thus providing an integration output signal that increases and decreases with the passing of time as a function of said first analogue signal and said second analogue signal, respectively; and a second comparator circuit receiving a second reference signal and connected to the output of said integrator for providing said third electric signal when there is equality between the integration output signal provided by said integrator and said second reference signal.

* * * * *